United States Patent
Olsson et al.

(10) Patent No.: US 11,782,684 B2
(45) Date of Patent: Oct. 10, 2023

(54) DECLARATIVE CONTAINER COMPONENTS FOR BUILDERS

(71) Applicant: Salesforce, Inc., San Francisco, CA (US)

(72) Inventors: Jan Ove Kristian Olsson, Castro Valley, CA (US); Dean Moses, Berkeley, CA (US); Adheip Varadarajan, Daly City, CA (US); Artem Dmytrenko, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 380 days.

(21) Appl. No.: 17/144,859

(22) Filed: Jan. 8, 2021

(65) Prior Publication Data
US 2021/0208856 A1   Jul. 8, 2021

Related U.S. Application Data

(63) Continuation of application No. 16/138,094, filed on Sep. 21, 2018, now Pat. No. 10,901,707.

(51) Int. Cl.
*G06F 8/34* (2018.01)
*G06F 8/38* (2018.01)
*G06F 3/0486* (2013.01)
*G06F 8/36* (2018.01)
*G06F 8/30* (2018.01)
*G06F 9/448* (2018.01)

(52) U.S. Cl.
CPC ........... *G06F 8/38* (2013.01); *G06F 3/0486* (2013.01); *G06F 8/313* (2013.01); *G06F 8/34* (2013.01); *G06F 8/36* (2013.01); *G06F 9/448* (2018.02)

(58) Field of Classification Search
CPC .......... G06F 9/448; G06F 9/4492; G06F 8/34; G06F 8/36; G06F 8/20; G06F 8/38; G06F 8/313
See application file for complete search history.

(56) References Cited

U.S. PATENT DOCUMENTS

| | | | |
|---|---|---|---|
| 2005/0203958 A1* | 9/2005 | Mitchell | ............... G06F 9/4492 |
| 2010/0229154 A1* | 9/2010 | Joe | ............................ G06F 8/20 717/107 |

OTHER PUBLICATIONS

Ledet et al, AU 2014274587, "Managing Items in a User Interface", Jan. 22, 2015, pp. 1-73 <AU_2014274587.pdf>.*

* cited by examiner

*Primary Examiner* — Tuan A Vu
(74) *Attorney, Agent, or Firm* — Holland & Hart LLP

(57) ABSTRACT

An application builder system includes an application builder server and a client-side application builder. The application builder server may receive, from a tenant user device, a request to store a data structure corresponding to a container component. The application builder server may identify one or more attributes of the data structure corresponding to a declarative use feature of the server. The application builder server may determine whether the data structure satisfies the declarative use feature of the server based on the attributes. The application builder server may expose the container component on the user interface based on the declarative use feature of the server. As such, a developer may upload a custom container component for use in an application builder application. Other users may download the custom container components and use the custom container component on the application builder application.

20 Claims, 11 Drawing Sheets

DECLARATIVE CONTAINER COMPONENTS FOR BUILDERS

CROSS REFERENCES

The present application for patent is a Continuation of U.S. patent application Ser. No. 16/138,094 by Olsson et al., entitled "DECLARATIVE CONTAINER COMPONENTS FOR BUILDERS," filed Sep. 21, 2018; assigned to the assignee hereof, and expressly incorporated herein.

FIELD OF TECHNOLOGY

The present disclosure relates generally to database systems and data processing, and more specifically to declarative container components for builders.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support an application builder service that may be used by a user to design and publish applications for displaying interaction data, sales data, marketing data, for entering such data, for interacting with other users, etc. Conventional application builder systems may provide declarative tools and some default components. However, the framework of these conventional application builder systems may restrict the integration of custom components in the application builder application.

DETAILED DESCRIPTION

Figure 1:
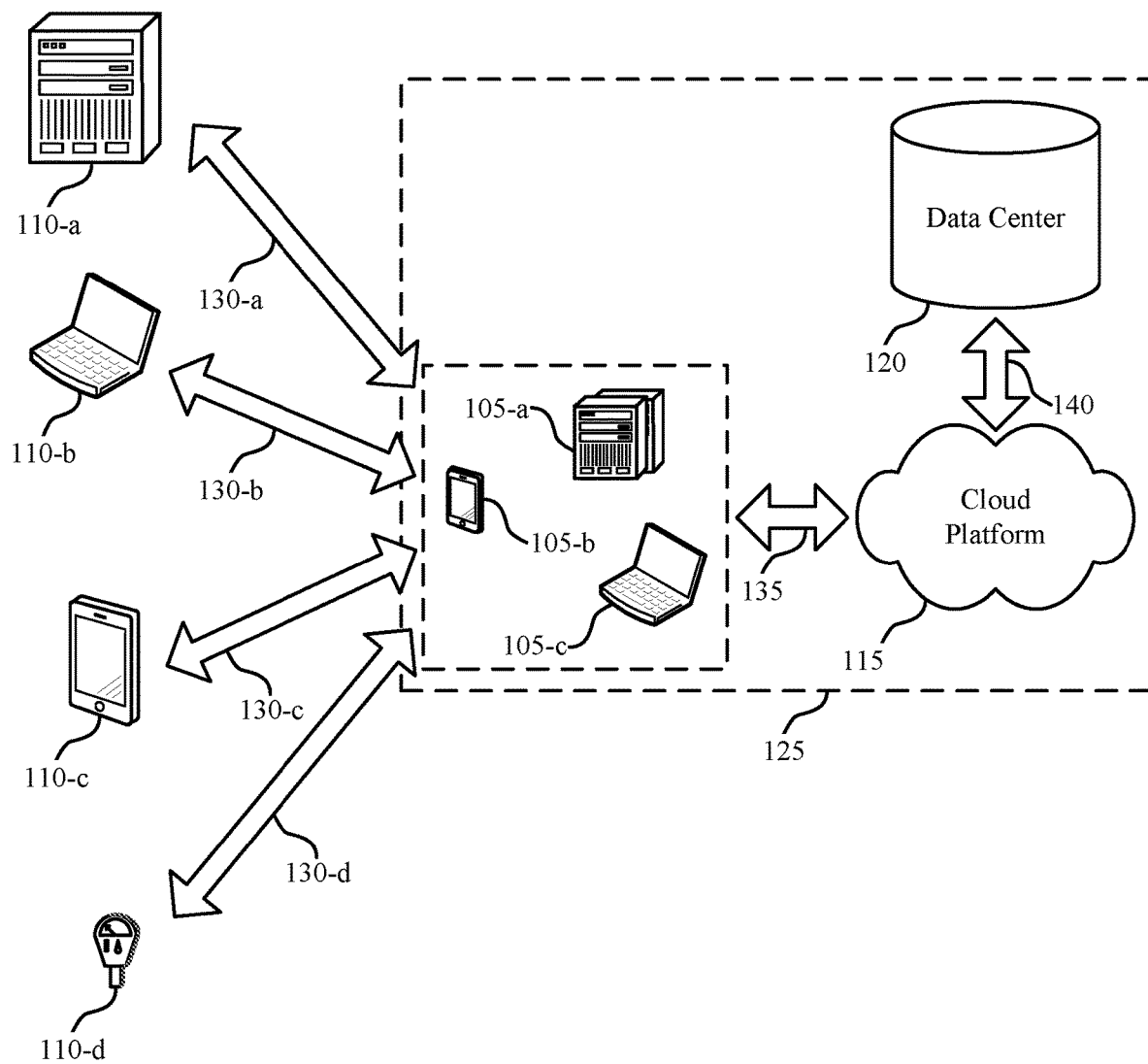
FIG. 1 illustrates an example of a system for editing components of a user interface that supports declarative container components for builders in accordance with aspects of the present disclosure.

An application builder system includes an application builder server and a client-side application builder application. A user of the client-side application designs applications for use by various users. Other users may utilize the custom applications to interact with client data (e.g., sales data), enter client data, monitor communications, etc. The application builder system described herein provides a user interface for designing custom applications. The application builder server provides declarative functions for building the application for the user, such that the user can build the application using intuitive tools and avoid (or minimize) writing or modifying code. For example, the user can drag and drop different components onto the user interface to implement the component in the application. In an example, the user may drag and drop a component such as a chart, form, spreadsheet, etc., from a list of components onto the user interface. When a user loads the application, the application builder server renders the component as part of the application.

The application builder application may provide some default container components. In general, container components contain other components. For example, container components may be used to organize or compile different components showing client data. The default container components may have fields or regions which are indicated to be used for the drag and drop feature of the application builder application. A user of the application builder application can drag a component into the drag and drop region, and the component is then rendered as contained by the container component.

A developer may design custom components for the application builder application. The developer may be a user of the application builder application or a separate, third-party developer. The custom components may be designed based on the declarative use of the application builder application, such that a user can drag and drop the custom component onto the user interface, and the custom component is implemented in the application.

The application builder server described herein may also store and expose custom container components for use in the application builder application. Other application builder servers may lack a framework to support custom container components, as other application builder servers have rigid formatting rules that may interfere with declarative use. Instead, the application builder server herein may receive custom container components from a developer, integrate the custom container components with the declarative features of the application builder application, and expose the custom container components for declarative use in the application builder application.

In an example, the application builder server may receive a package of custom container components. The application builder server may identify attributes of the custom container components which indicate the custom container components are configured for the declarative use function of the application builder application. For example, the application builder server may identify one or more attributes indicating regions or facets of a custom container component which are configured as droppable regions for the drag and drop feature. The application builder server may expose the custom container components on the application builder application, providing access to the custom container components to other users. The flexible framework of the application builder server may support containing any component in the custom container components. A user of the application builder application can drag and drop other components into the droppable regions of the custom container components, and the components will be shown as contained by the custom container component.

Aspects of the disclosure are initially described in the context of an environment supporting an on-demand database service. Aspects of the disclosure are further illustrated by and described with reference to apparatus diagrams, system diagrams, and flowcharts that relate to declarative container components for builders.

FIG. 1 illustrates an example of a system 100 for cloud computing that supports declarative container components for builders in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Cloud platform 115 may offer an application builder service to the cloud client 105. In some cases, the cloud client 105 may utilize the application builder application to design applications for use by the cloud client 105 and/or one or more of the contacts 110. For example, cloud client 105 may design an application for displaying interaction data (e.g., associated with an interaction 130), sales data, marketing data etc. corresponding to a particular contact 110. The designed application may be accessible via an application executable on a computing device of the client 105 or via a browsing application (e.g., a web browser) executable on the computing device of the client 105. In some cases, the designed application may be a frame or sub-frame of a webpage, web-application, or the like. In some cases, a user (e.g., client 105) with administrative rights may utilize the application builder application to design the application for the client 105 (e.g., for a specific contact 110 or for many contacts of the client).

The application builder service may include a client facing component with a user interface for designing applications for clients 105 and/or contacts 110. The application builder application may be preconfigured with a number of different component types that may be utilized to design an application. Example component types include pages, containers, forms, fields, etc. The user interface of the client facing component may include a component pane with selectable components corresponding to the different components. The components may be linked to various data sources and processes.

The application builder service may provide declarative function of building the application for the user, such that the user can build the application using intuitive tools and features, such as a drag and drop feature. Based on the declarative use features, the user can avoid writing or modifying code in order to create an application. The user may select (e.g., click) a component from the component pane, drag the component to an application builder pane (e.g., a canvas), and drop the component to a desired area of the application. After the user publishes or releases the application, the client 105 and/or contacts 110 may access the application to access information and services provided by the application.

The application builder service may provide some default container components. Container components contain other components. For example, the user may drag a default container component from the component pane onto the user interface. The default container component may be exposed on the user interface, indicating a region within the default container component to drag and drop other components. The user may then drag and drop other components into the specified regions of the container component.

A developer, such as a cloud client 105 or a contact 110, may design custom components for the application builder service. The custom components may be designed based on the declarative features of the application builder application, such that a user can drag and drop the custom component onto the user interface, and the custom component is implemented in the application. The application builder server described herein may store and implement custom container components. Due to the declarative use functions of the application builder application, other application builder servers may not have a framework to flexibly intake custom container components and implement the custom container components with declarative functions. An application builder server described herein may receive custom container components, such as from a third party developer, and expose the container components on the application builder application such that the custom container components may be declaratively used by users of the application builder application.

In an example, the application builder server may receive a package of custom container components from a developer. The application builder server may identify attributes of the custom container components which indicate the custom container components are configured to contain other components. The attributes may indicate the custom container components are compatible with the declarative use features of the application builder application. For example, the application builder server may identify one or more regions of the custom container components which are configured for a drag and drop feature. The application builder server may provide access to the custom container components to other users, and the flexible framework of the application builder server may support containing components in the custom container components using the declarative use features (e.g., drag and drop features) of the application builder application.

It should be appreciated by a person skilled in the art that one or more aspects of the disclosure may be implemented in a system 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In an example, a component developer, such as a cloud client 105 or a contact 110, designs a custom container component for use on the application builder application. The custom container component may be represented by a data structure for a component with attributes which indicate the type of the component, restrictions for the component, functions of the component, etc. The component developer sends a package including the data structure for the custom container component to the application builder server. The component developer may request for the application builder server to store the custom container component on the application builder server. The application builder server may identify the attributes of the data structure for the custom container component. For example, there may be an attribute which indicates the custom container component is a container component or a component which is configured to contain other components. There may be attributes of the data structure which indicate which regions of the custom container component are configured for the drag and drop features of the application builder application. Once placed on the user interface, the droppable regions are displayed on the user interface as part of the custom container component. In some cases, there may be attributes which indicate restrictions for the custom container component, such as a specific type of component which may be contained by the custom container component.

The application builder server may expose the custom container component for use by a user of the application builder application (e.g., another cloud client 105). The user may be able to use the custom container component when designing an application for another client 105 or a contact 110. On a user interface of the application builder application, the custom container component may be listed on a component pane with other components. The user may drag the custom container component from the component pane onto an application building pane of the user interface. The custom container component may be shown on the application building pane and indicate a region which is configured to contain other components. The user may drag (e.g., click and move a cursor) another component from the component pane onto the indicated region and drop (e.g., release the cursor) the component in the indicated region. The component may be shown to as contained by the custom container component in the application building pane.

Figure 2:
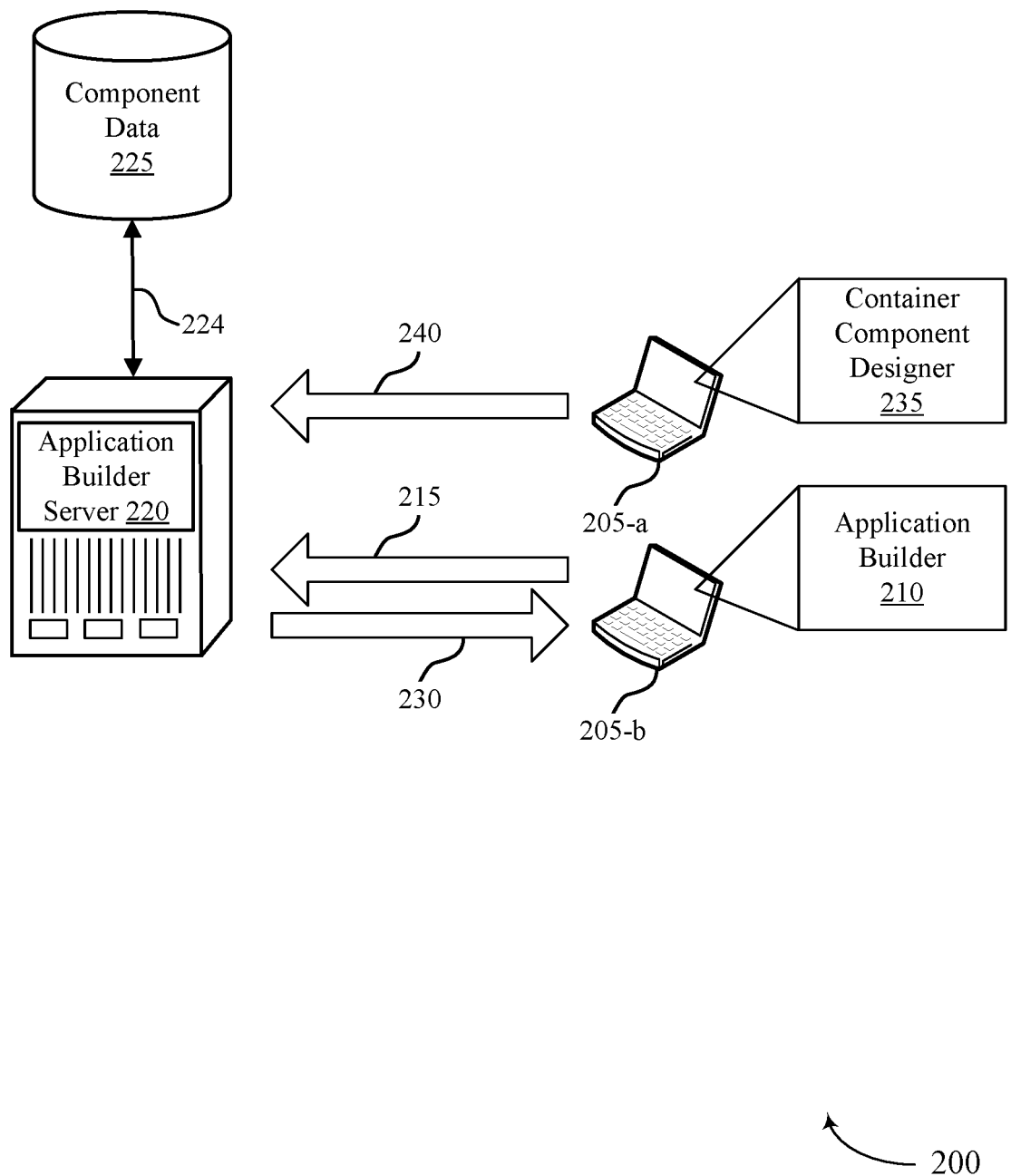
FIG. 2 illustrates an example of a system that supports declarative container components for builders in accordance with aspects of the present disclosure.

FIG. 2 illustrates an example of a system 200 that supports declarative container components for builders in accordance with aspects of the present disclosure. The system 200 may include user device 205-*a*, user device 205-*b*, and application builder server 220. The user devices 205 and application builder server 220 may be examples of components of the subsystem 125 described with reference to FIG. 1. For example, the user devices 205 may be examples of a cloud client 105, and the application builder server 220 may be an example of a cloud platform 115 or a data center 120. As shown, the application builder server 220 may support an application builder application 210 at the user devices 205. In the illustrated example, user device 205-*a* may be an example of a component developer, and user device 205-*b* may be an example of a user of the application builder application 210. In other examples, the user of the application builder application 210 and the component developer may be the same.

User device 205-a may design a container component for the application builder application 210. The container component may be a data structure with attributes that integrate with the declarative features of the application builder application 210. User device 205-a may include the data structure for the container component as part of a package and transmit the package over a communication link 240. The application builder server 220 may store the data structure for other users to use in the application builder application 210. In some cases, the application builder server 220 may store the data structure for the container component in the component data database 225. The application builder server 220 may expose the container component on the application builder application 210 such that other users can use the container component.

The application builder server 220 may receive an incoming communication message over a communication link 215 from user device 205-b. User device 205-b may request to use the container component designed by user device 205-a for an application. Application builder server 220 may receive the request for the container component and retrieve, via a connection 224, a data structure from the component data database 225 corresponding to the container component. In some cases, user device 205-b may be an example of a tenant of the application builder server 220, or a subscriber to a service provided by the application builder server 220.

The application builder server 220 may identify a set of attributes of the data structure of the container component. In some cases, there may be an attribute which indicates the data structure corresponds to a container component type, or that the container component is a component which contains other components. A component may declare it is a container component by exposing one or more attributes corresponding to a component array or a facet. These attributes may tell the application builder server 220 and any users to treat the component as a declaratively exposed container component attribute by declaring the attribute in the design file of the component. For example, if a component has a container array attribute (e.g., "Aura.Component[ ]") exposed, that component may be a container component. In some cases, each facet may correspond to a region configured to contain another component. As such, some container components may contain multiple components if there are multiple facet attributes or multiple containing regions.

Figure 4:
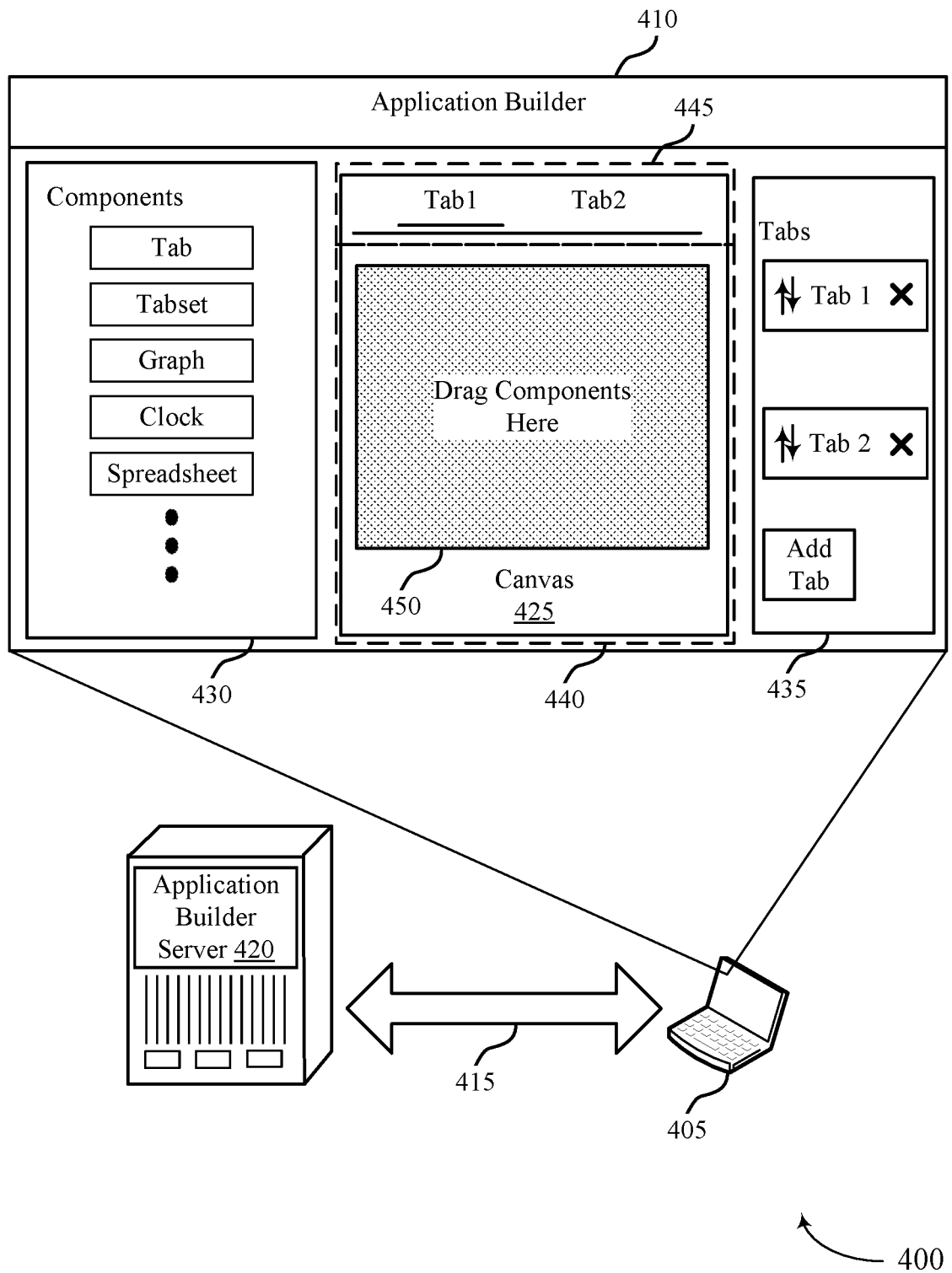
FIG. 4 illustrates an example of a system that supports declarative container components for builders in accordance with aspects of the present disclosure.

The application builder server 220 may determine which editor to use when configuring the container component in the application builder application 210. The application builder server 220 may determine the configuration for the component editor based on one or more attributes of the container component data structure. For example, the custom container component may be similar to a tabset container component. The tabset component may contain one or more tab components, where the tab components also can store one or more components (e.g., as illustrated in FIG. 4). The component editor may include options for adding or removing tabs of the tabset, reordering tabs, and relabeling tab labels. For example, adding a tab may create a new instance of a tab component which is pushed into the tabs attribute array. In examples described herein, a tabset and tabs are just used as examples of container components. In other examples, a component developer may create a different type of container component.

In some cases, the data structure of the custom container component may include an attribute which restricts what type of components are allowed to be contained by the container component. In an example where the custom container component is based on a tabset component, the restricting attribute may restrict that only tab components can be placed inside the tabset. In some cases, the tab component may have some attributes indicating its availability for the tabset component.

In some cases, the container component may include a default set of components that are pushed into the container in the application builder application 210 upon starting the application. For example, if the container component is a tabset, the tabset may be configured to include two tab components by default.

The tab component may include attributes which configure a body attribute of the tab as a facet that can contain other components. When a user adds components to the tab (e.g., by drag and drop), those components are created and injected into the body facet by the framework.

As such, any container component exposed for declarative use may not have to know about details of customization in the application builder application 210 or what the container component contains at runtime. The system framework may inject components configured by the user into facets of the container component at runtime. For example, the tabset component (e.g., a tabs array) contains all tab components configured by the user. At runtime of the application, the tabset component renders the tabs as configured by the user.

The application builder server 220 may send a message over communication link 230 to user device 205-b. For example, if user device 205-b requests to store a container component at the application builder server 220, the application builder server 220 may expose the container component for use on the application builder application 210. The application builder server 220 may transmit a message which exposes the container component on the application builder application 210 at the user device 205-b. In another example, the user device 205-b may initialize the application, and the application builder server 220 may transmit rendering instructions to user device 205-b.

In some cases, the container component may be designed at user device 205-b. For example, user device 205-b may design the container component using a container component designer 235. A data structure corresponding to the container component may be sent to the application builder server 220 as part of a package. The package may contain multiple data structures for different container components. In some cases, user device 205-b may upload the package such that other users may also use the custom container component with the application builder application 210. In some cases, user device 205-b may both design the container component and use the container component with the application builder application 210.

Figure 3:
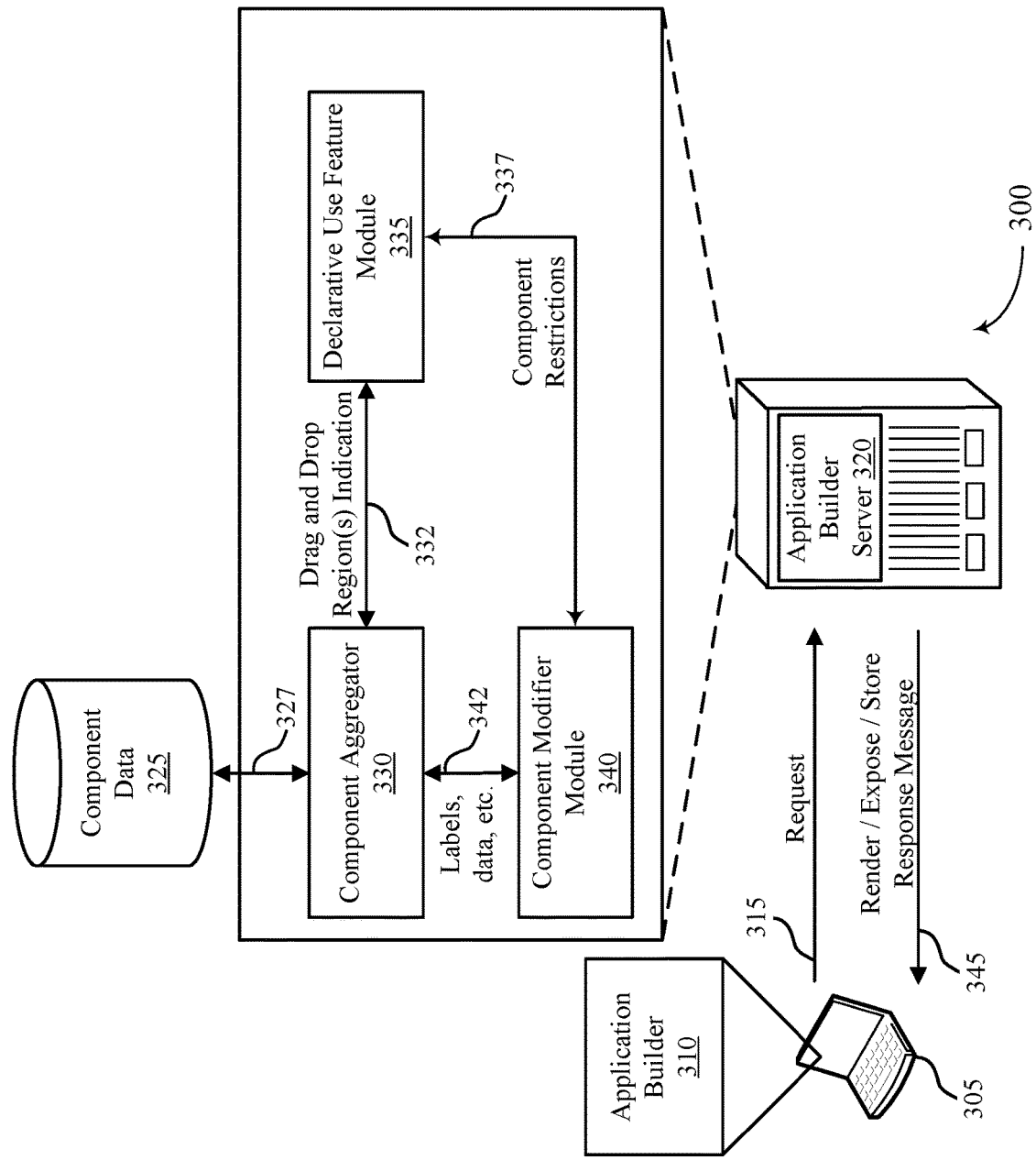
FIG. 3 illustrates an example of a system that supports declarative container components for builders in accordance with aspects of the present disclosure.

FIG. 3 illustrates an example of a system 300 that supports declarative container components for builders in accordance with aspects of the present disclosure. The system 300 may include a user device 305 and an application builder server 320. The user device 305 and the application builder server 320 may be examples of devices of a subsystem 125 described with reference to FIG. 1, or examples of corresponding devices described with reference to FIG. 2. For example, user device 305 may be an example of a client device 105, and the application builder server 320 may be an example of a cloud platform 115 or a data center 120. The application builder server 320 may support an application builder application 310 at the user device 305.

A container component may be a component which is configured to contain other components. The other components may include other container components (e.g., a tabset contains tabs), or the other components may include non-container components (e.g., tabs may contain charts, graphs, etc.). A container component may include one or more attributes which indicate the container component is configured as a container component. For example, the container component may include one or more container array attributes, in some cases referred to as facet attributes, which indicate a facet or region of the container component which can contain other components. The component array attribute type may indicate which part of a component is configured to contain other components. For example, a body of a component may be configured to have a type of component array, indicating that the body of the component is used to contain other components. When the user device 305 adds (e.g., by drag and drop) a component to the facet of the container component, the application builder server 320 injects the component into facet of the container component. Thus, the user device 305 may utilize custom container components to store any component based on a flexible framework of the application builder server 320.

By configuring a facet attribute of a container component, the container component can contain any component (unless otherwise restricted by another attribute). As such, the techniques described herein support a flexible framework at the application builder server 320 such that a developer can design a custom container component which can contain any other component. Based on attributes indicating a facet of the custom container component, the user device 305 may use declarative features to drag and drop components into the facet of the custom container component.

As described in FIG. 2, in some cases the user device 305 may be the developer of the container component. Or, in other examples, a contact or another user device may be the developer of the container component, and the user device 305 uses the custom container component in the application builder application 310. The developer may send the custom container components to the application builder server 320, and the custom container components may be exposed on the application builder application 310. As described herein, the developer indicates what part of the container component is configured to contain other components (e.g., the facts or droppable regions), and the application builder server 320 may expose the container component for declarative use within the application builder application 310. The user device 305 may install a package containing the custom container component and use declarative tools to drag and drop components into the container component. The user device 305 may use any default, custom, or downloaded components with the custom container component.

The user device 305 may send a request message 315 to the application builder server 320. The request message 315 may include a request to store a data structure corresponding to a container component. In some cases, the container component may be created by the user device 305, or the container component may be created by a third party developer (e.g., another user device 305 or a user contact). In some cases, the request may be to store a container component at the application builder server 320, or to expose a specific container component for use in the application builder application 310, or to use a container component in an application built using the application builder application 310.

The application builder server 320 may process the request message 315 using one or more components such as a component aggregator 330, a declarative use feature module 335, or a component modifier module 340. In some cases, the application builder server 320 may interface with a component data database 325, which may be an example of a data center 120 of the subsystem 125.

The component aggregator 330 may retrieve and send data structures for components. For example, the component aggregator 330 may receive a data structure corresponding to the request message 315. In some cases, the component aggregator 330 may store the data structure in the component data database 325. If the request message 315 relates to exposing a data structure for use with the application builder application 310, the component aggregator 330 may retrieve the corresponding data structure from the component data database 325.

The declarative use feature module 335 may identify attributes of a data structure of a component which are related to a declarative use feature of the application builder server 320. For example, the declarative use feature module 335 may identify an attribute of the data structure which indicates the data structure corresponds to a container component. Container components are configured to contain other components. In some cases, a container component may contain other container components, such as a tabset containing tabs. The declarative use feature module 335 may identify regions or facets of the container which are configured for declarative use features of the application builder application 310. For example, the declarative use feature module 335 may identify attributes which indicate regions configured for drag and drop features in the application builder application 310. A user may drag and drop a component onto the regions, and the application builder server 320 injects the component into the region at runtime for the application. The component aggregator 330 may send information related to a data structure of a container component, and the declarative use feature module 335 may identify attributes of the data structure related to the declarative use feature of the application builder application 310. The declarative use feature module 335 and the component aggregator 330 may communicate drag and drop region indications corresponding to the facet attributes over a link 332.

The component modifier module 340 may modify a component stored in the component data database 325 or uploaded by the user device 305. For example, the component modifier module may add or remove an attribute of the component. For example, the component modifier module 340 may add a tab component to a tabset component (e.g., increasing a number of tabs in the tabset from two tabs to three tabs). Or, in another example, the component modifier module 340 may change a value for an attribute of the component. For example, the component modifier module 340 may change text in a label of the component or restrict a type of component which can be contained by a container component. The component modifier module 340 and the declarative use feature module 335 may communicate component restrictions for a container component over a link 337. The component modifier module 340 and the component aggregator 330 may communicate any modification to label values, field values, or other data values over a link 342.

The application builder server 320 may transmit a response message 345 to the user device 305. In some cases, the response message 345 may include rendering instructions for the application builder application 310, or a confirmation message that a container component package was uploaded to the component data database 325 and available to other user devices, or the response message 345 may include a requested package of container components.

FIG. 4 illustrates an example of a system 400 that supports declarative container components for builders in accordance with aspects of the present disclosure. The system 400 may include a user device 405 and an application builder server 420. The user device 405 and the application builder server 420 may be examples of devices of a subsystem 125 described with reference to FIG. 1, or examples of corresponding devices or components described with reference to FIGS. 2 and 3. For example, user device 405 may be an example of a client device 105, and the application builder server 420 may be an example of a cloud platform 115 or a data center 120. The application builder server 420 may support an application builder application 410 at the user device 405.

As described herein, the user device 405 may access an application builder application 410 hosted by the application builder server 420. The user device 405 may use developer-created container components in the application builder application 410. The user device 405 may communicate with the application builder server 420 over a communication link 415.

A user interface of the application builder application 410 may include a canvas 425, a component pane 430, and a component editor pane 435. The user device 405 may select a template for the canvas 425, and the canvas 425 may include a set of default component facets based on the selected template. In some conventional application builder applications, the user device 405 would be unable to introduce custom container components to introduce additional component facets to organize components in the canvas 425. However, using techniques described herein, the application builder server 420 may receive custom container components from a developer and expose the custom container components for use on the application builder application 410. Then, the custom container components can be used with the declarative use features of the application builder application 410, such as drag and drop.

A user of the user device 405 may drag and drop components into the canvas 425, and the application builder server 420 renders that component in the canvas 425. In this example, the user has dragged a tabset into the canvas. The tabset may be an example of a container component which contains tabs. The tabset may have a default set of components contained by the tabset. For example, the tabset may have two tabs which are injected into the tabset upon rendering. A designer for a custom container component may configure a set of default components in a container component by modifying an attribute of the custom container component. For example, the custom container component may have an "attributeDefault" attribute in a design file which indicates which default components are pushed into the container component when the container component is added to the canvas 425. The application builder server 420 may identify the default attribute and push the indicated components into the custom container component when rendering the custom container component.

In some cases, a container component may restrict a type of component from being inserted in the container component. For example, a tabset container component may only be allowed to contain tabs. A custom container component may be configured with an allowed interfaces attribute which tells the application builder server 420 what type of components are allowed in the facets of the custom container component. In some cases, different facets of the custom container component may have different restrictions. For example, a first facet of a custom container component may only be allowed to contain a graph, while a second facet of the custom container component may only be allowed to contain a spreadsheet. The application builder server 420 may identify the restrictions based on the allowed interfaces attribute and prevent any restricted components from being inserted in the corresponding facets of the custom container component. For example, if a user tries to drag and drop a clock into a facet of a container component which is configured to only contain a spreadsheet, the application builder server 420 may prevent the clock from being inserted into the facet based on the restriction.

A tab contained by the tabset may also be an example of a container component. A tab may include, for example, a droppable region 450. In some cases, the droppable region 450 may be referred to as a facet. A custom container component may include an attribute which indicates a droppable region 450 of the custom container component. The application builder server 420 may identify the attribute indicating the droppable region 450 and, when the custom container component is dragged and dropped in the canvas 425, render the droppable region 450 in the indicated part of the custom container component. The custom container component may include one or more droppable regions 450, which may be based on a number of facet attributes in a design file of the container component.

The component editor pane 435 may be used to modify values or features of a component. In a tabset example, the user device 405 may add or remove tabs from the tabset or rearrange the order of the tabs. In some cases, the component editor pane 435 may be used to modify labels, data sources, visual or style characteristics, or other features of a custom container component.

Figure 5:
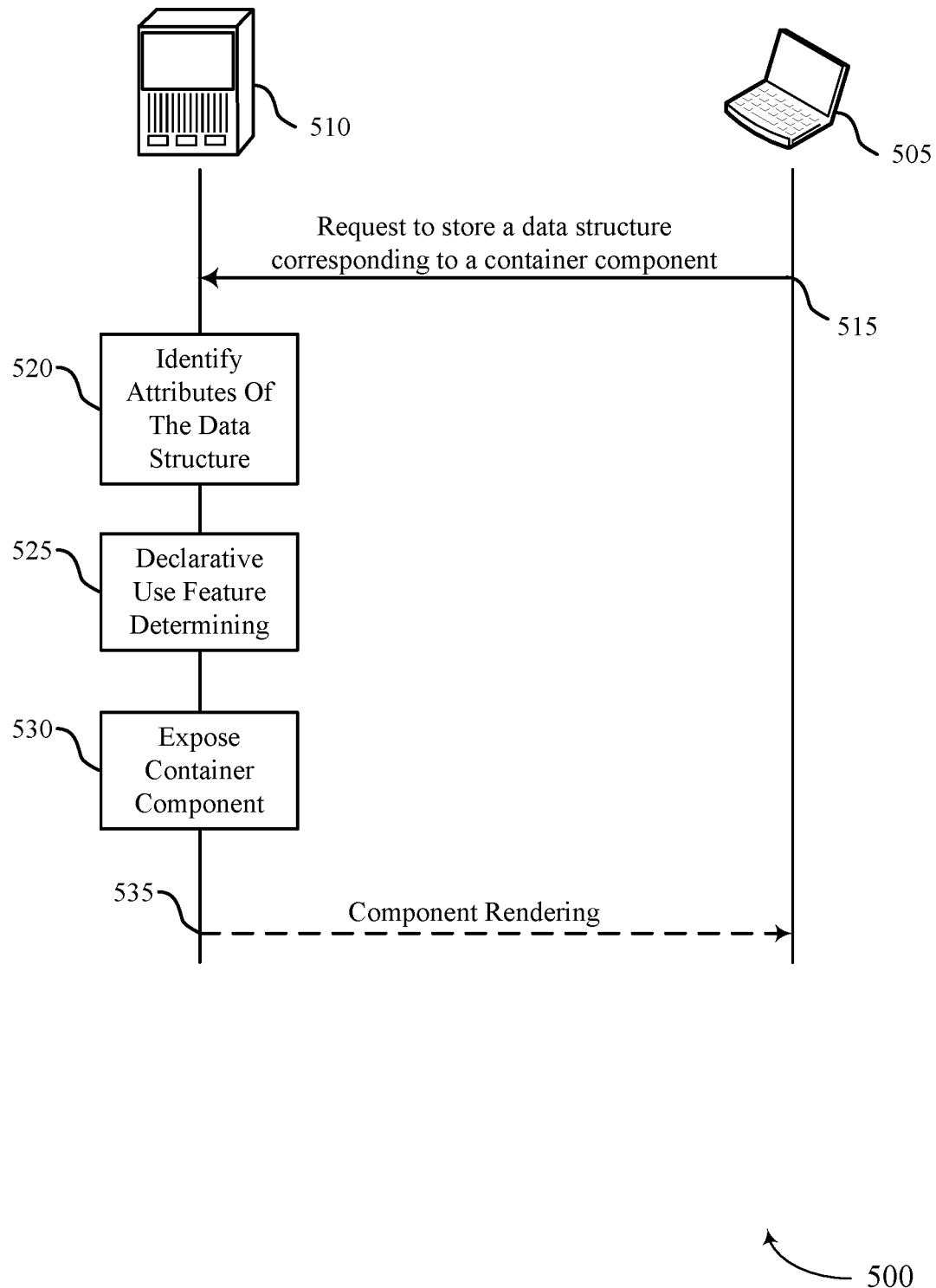
FIG. 5 illustrates an example of a process flow that supports declarative container components for builders in accordance with aspects of the present disclosure.

FIG. 5 illustrates an example of a process flow 500 that supports declarative container components for builders in accordance with aspects of the present disclosure. The process flow 500 may include a user device 505 and an application builder server 510. The user device 505 and the application builder server 510 may be examples of devices of a subsystem 125 described in FIG. 1. For example, user device 505 may be an example of a client device 105, and the application builder server 510 may be an example of a cloud platform 115 or a data center 120. The application builder server 510 may support an application builder application at the user device 405.

At 515, the user device 505 may request to store a data structure corresponding to a container component. In some cases, the user device 505 may be used by a developer to design a custom container component, and the user device 505 requests for the application builder server 510 to host the custom container component. Then, users of the application builder application can download and use the custom container component in the application builder application.

At 520, the application builder server 510 may identify one or more attributes of the data structure corresponding to a declarative use feature of the server. For example, the application builder server 510 may identify a facet attribute or container array attribute of the container component which indicates the container component is configured to contain other components. In some cases, the application builder server 510 may identify a droppable region of the container component based on the one or more attributes of the data structure. For example, the facet attribute may indicate a region of the container component which is configured for drag and drop in accordance with the declarative use features of the application builder server 510.

At 525, the application builder server 510 may determine the data structure satisfies the declarative use feature of the server based on the one or more attributes. For example, the application builder server 510 may check whether the container component has appropriate configured attributes which conform to the declarative use features of the application builder application. In some cases, application builder server 510 may determine the container component has a facet or droppable region for containing other components.

At 530, the application builder server 510 may expose the container component on the user interface using the declarative use feature of the server. For example, the application builder server 510 may expose the container component in the component pane among other components available to build an application. In some cases, a user of the application builder application may download the container component, such as in a package of container components.

In some cases, at 535, the application builder server 510 may render the container component as part of a component pane on the user interface. In some cases, the application builder server 510 may render the container component on a canvas of the user interface. The application builder server 510 may render the container component and one or more droppable regions (e.g., facets) of the container component once the container component is dragged and dropped onto the user interface from the component pane.

Figure 6:
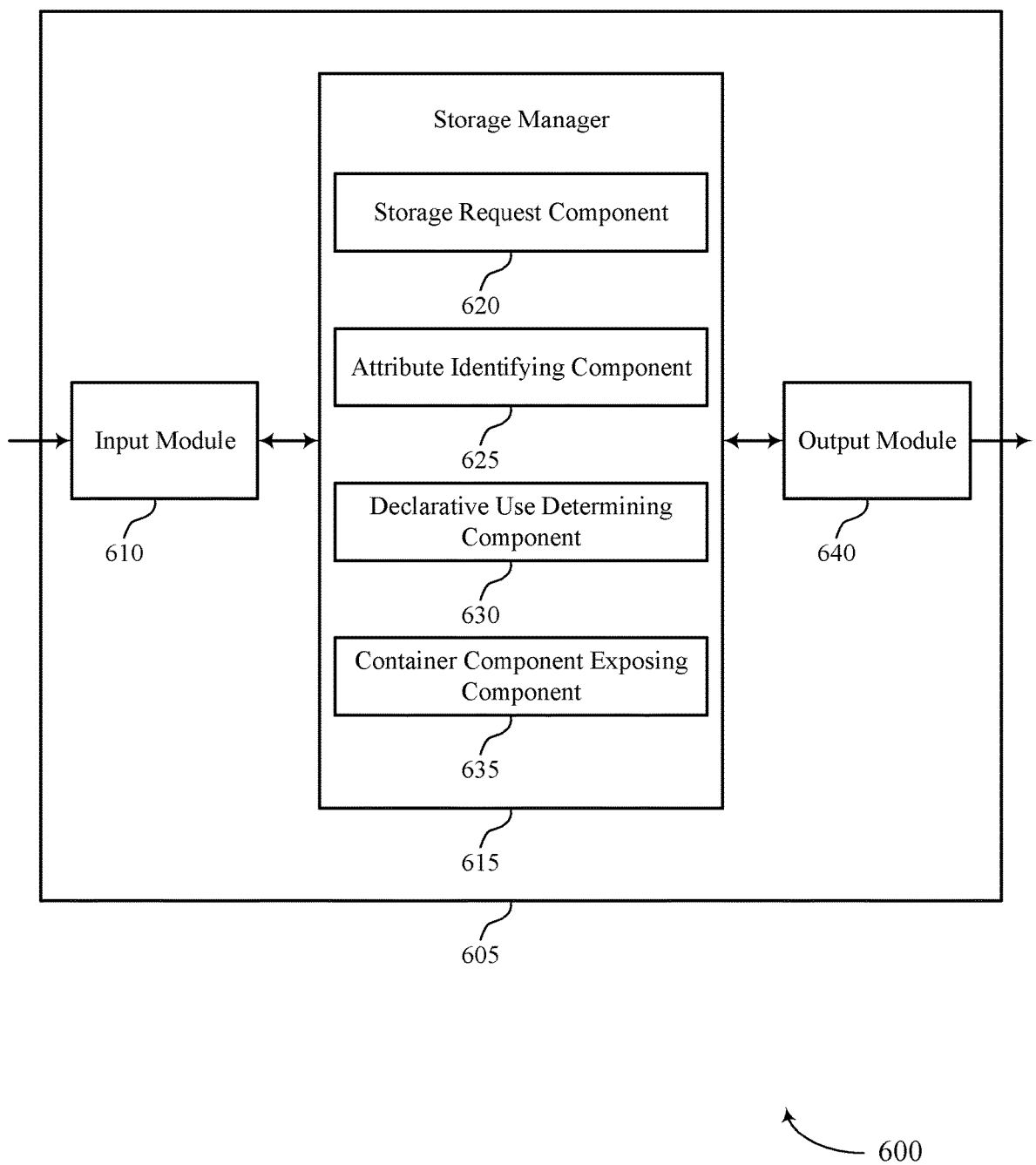
FIG. 6 shows a block diagram of an apparatus that supports declarative container components for builders in accordance with aspects of the present disclosure.

FIG. 6 shows a block diagram 600 of an apparatus 605 that supports declarative container components for builders in accordance with aspects of the present disclosure. The apparatus 605 may include an input module 610, a storage manager 615, and an output module 640. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the storage manager 615 to support declarative container components for builders. In some cases, the input module 610 may be a component of an input/output (I/O) controller 815 as described with reference to FIG. 8.

The storage manager 615 may include a storage request component 620, an attribute identifying component 625, a declarative use determining component 630, and a container component exposing component 635. The storage manager 615 may be an example of aspects of the storage manager 705 or 810 described with reference to FIGS. 7 and 8.

The storage manager 615 and/or at least some of its various sub-components may be implemented in hardware, software executed by a processor, firmware, or any combination thereof. If implemented in software executed by a processor, the functions of the storage manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The storage manager 615 and/or at least some of its various sub-components may be physically located at various positions, including being distributed such that portions of functions are implemented at different physical locations by one or more physical devices. In some examples, the storage manager 615 and/or at least some of its various sub-components may be a separate and distinct component in accordance with various aspects of the present disclosure. In other examples, the storage manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The storage request component 620 may receive, at a server and from a tenant user device, a request to store a data structure corresponding to a container component.

The attribute identifying component 625 may identify one or more attributes of the data structure corresponding to a declarative use feature of the server.

The declarative use determining component 630 may determine the data structure satisfies the declarative use feature of the server based on the one or more attributes.

The container component exposing component 635 may expose the container component on the user interface using the declarative use feature of the server.

The output module 640 may manage output signals for the apparatus 605. For example, the output module 640 may receive signals from other components of the apparatus 605, such as the storage manager 615, and may transmit these signals to other components or devices. In some specific examples, the output module 640 may transmit output signals for display in a user interface, for storage in a database or data store, for further processing at a server or server cluster, or for any other processes at any number of devices or systems. In some cases, the output module 640 may be a component of an I/O controller 815 as described with reference to FIG. 8.

Figure 7:
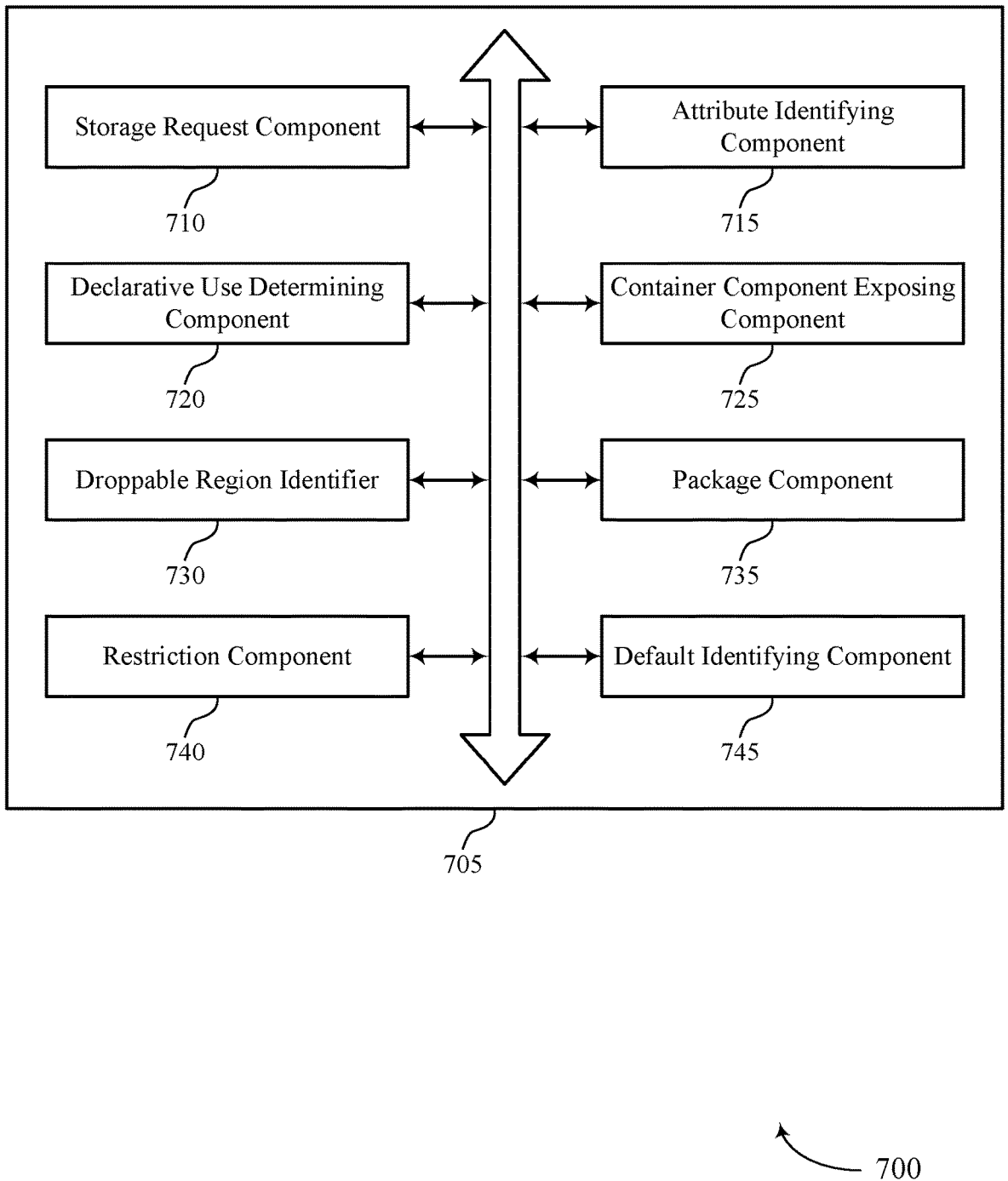
FIG. 7 shows a block diagram of a storage manager that supports declarative container components for builders in accordance with aspects of the present disclosure.

FIG. 7 shows a block diagram 700 of a storage manager 705 that supports declarative container components for builders in accordance with aspects of the present disclosure. The storage manager 705 may be an example of aspects of a storage manager 615 or a storage manager 810 described herein. The storage manager 705 may include a storage request component 710, an attribute identifying component 715, a declarative use determining component 720, a container component exposing component 725, a droppable region identifier 730, a package component 735, a restriction component 740, and a default identifying component 745. Each of these modules may communicate, directly or indirectly, with one another (e.g., via one or more buses).

The storage request component 710 may receive, at a server and from a tenant user device, a request to store a data structure corresponding to a container component. In some examples, the storage request component 710 may receive, at the server and from the tenant user device, a second request to store a second data structure corresponding to a non-container component.

In some examples, the storage request component 710 may expose the non-container component on the user interface using the declarative use feature of the server, where the non-container component is contained by the container component. In some cases, the container component includes a third-party-developed container component configured for the declarative use feature of the server. In some cases, the container component contains one or more non-container components.

The attribute identifying component 715 may identify one or more attributes of the data structure corresponding to a declarative use feature of the server. In some cases, a component array attribute of the one or more attributes of the data structure indicates the container component is configured to contain other components. In some cases, the container component includes one or more features modifiable by an administrator of the tenant user device based on the declarative use feature of the server.

The declarative use determining component 720 may determine the data structure satisfies the declarative use feature of the server based on the one or more attributes. In some cases, the declarative use feature of the server includes a drag and drop feature, and the container component is configured for the drag and drop feature.

The container component exposing component 725 may expose the container component on the user interface using the declarative use feature of the server. In some cases, the user interface is for a web development platform.

The droppable region identifier 730 may identify a droppable region of the container component based on the one or more attributes of the data structure. The package component 735 may receive, from the tenant user device, a package of components including the data structure corresponding to the container component.

The restriction component 740 may restrict a type of component from being contained by the container component based on the one or more attributes. The default identifying component 745 may identify a set of default components contained by the container component, where the set of default components is exposed on the user interface within the container component.

Figure 8:
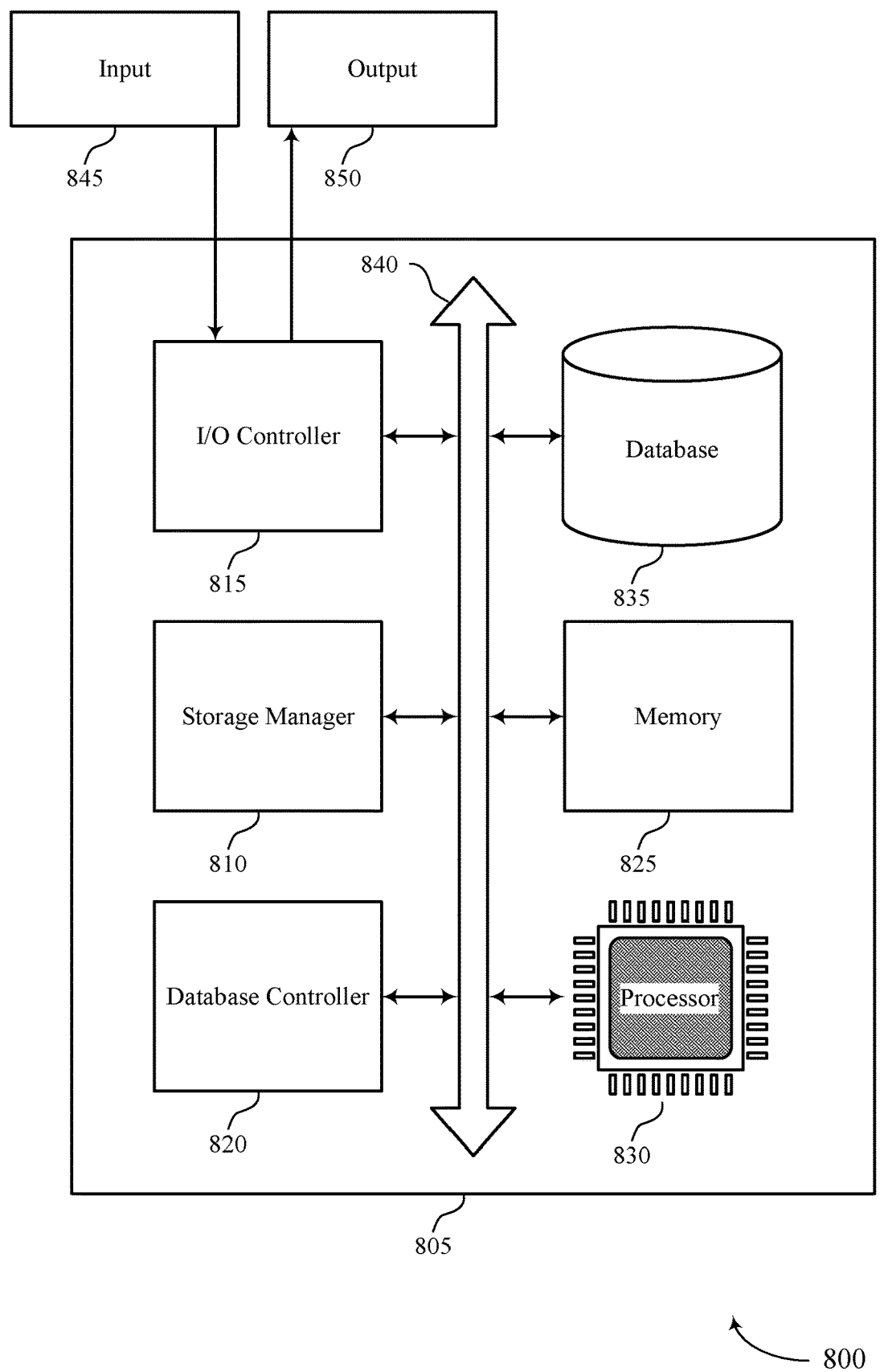
FIG. 8 shows a diagram of a system including a device that supports declarative container components for builders in accordance with aspects of the present disclosure.

FIG. 8 shows a diagram of a system 800 including a device 805 that supports declarative container components for builders in accordance with aspects of the present disclosure. The device 805 may be an example of or include the components of a database server or an apparatus 605 as described herein. The device 805 may include components for bi-directional data communications including components for transmitting and receiving communications, including a storage manager 810, an I/O controller 815, a database controller 820, memory 825, a processor 830, and a database 835. These components may be in electronic communication via one or more buses (e.g., bus 840).

The storage manager 810 may be an example of a storage manager 615 or 705 as described herein. For example, the storage manager 810 may perform any of the methods or processes described above with reference to FIGS. 6 and 7. In some cases, the storage manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting declarative container components for builders).

Figure 9:
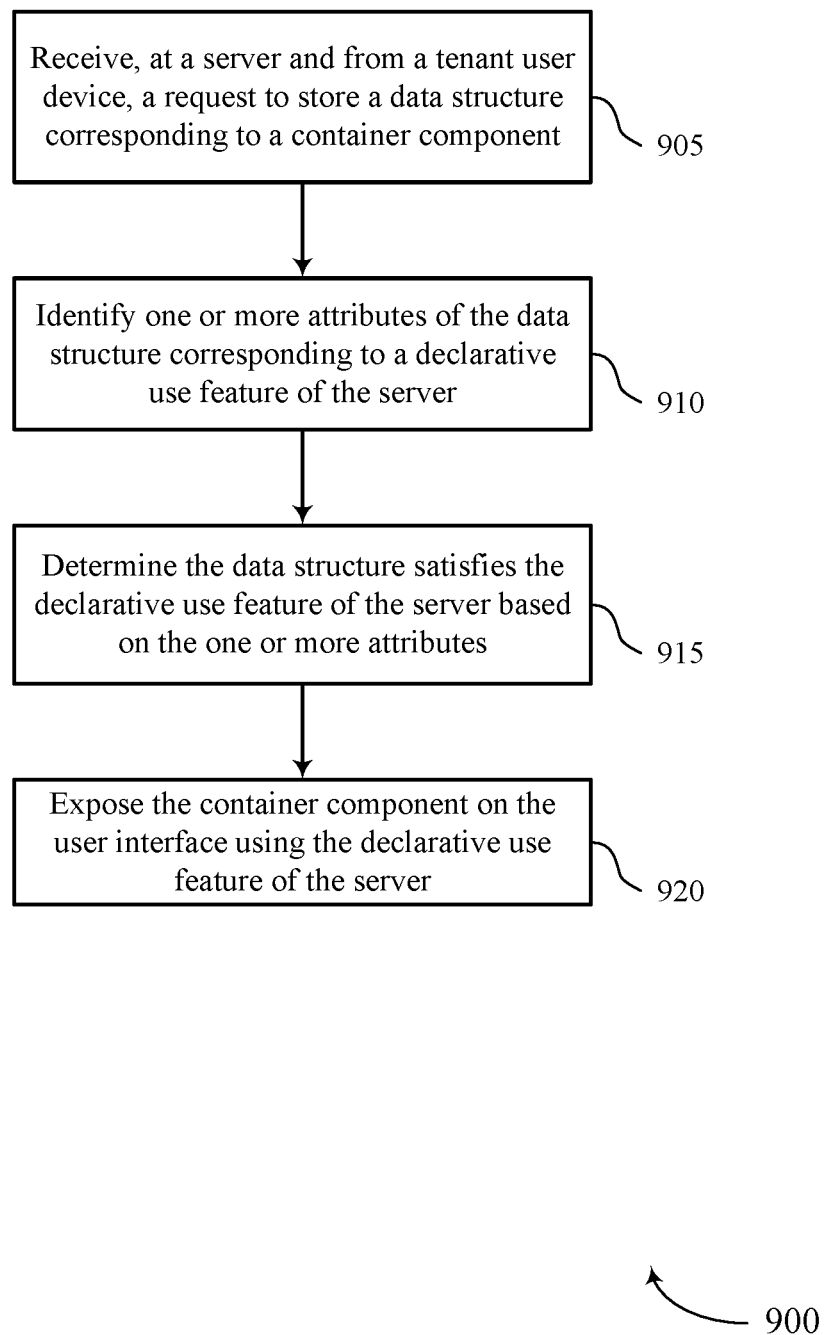
FIGS. 9 through 11 show flowcharts illustrating methods that support declarative container components for builders in accordance with aspects of the present disclosure.

FIG. 9 shows a flowchart illustrating a method 900 that supports declarative container components for builders in accordance with aspects of the present disclosure. The operations of method 900 may be implemented by a database server or its components as described herein. For example, the operations of method 900 may be performed by a storage manager as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 905, the database server may receive, at a server and from a tenant user device, a request to store a data structure corresponding to a container component. The operations of 905 may be performed according to the methods described herein. In some examples, aspects of the operations of 905 may be performed by a storage request component as described with reference to FIGS. 6 through 8.

At 910, the database server may identify one or more attributes of the data structure corresponding to a declarative use feature of the server. The operations of 910 may be performed according to the methods described herein. In some examples, aspects of the operations of 910 may be performed by an attribute identifying component as described with reference to FIGS. 6 through 8.

At 915, the database server may determine the data structure satisfies the declarative use feature of the server based on the one or more attributes. The operations of 915 may be performed according to the methods described herein. In some examples, aspects of the operations of 915 may be performed by a declarative use determining component as described with reference to FIGS. 6 through 8.

At 920, the database server may expose the container component on the user interface using the declarative use feature of the server. The operations of 920 may be performed according to the methods described herein. In some examples, aspects of the operations of 920 may be performed by a container component exposing component as described with reference to FIGS. 6 through 8.

Figure 10:
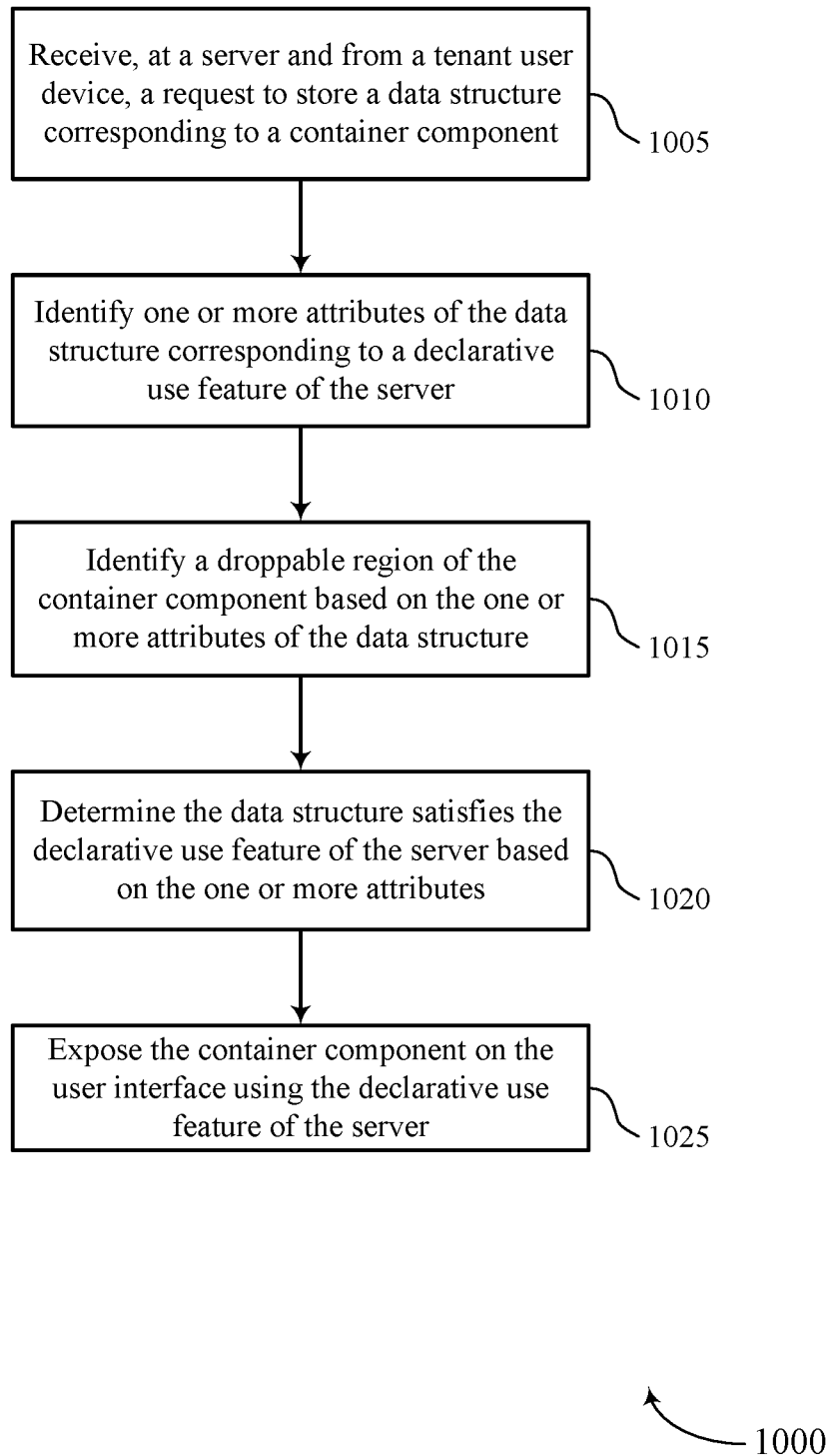

FIG. 10 shows a flowchart illustrating a method 1000 that supports declarative container components for builders in accordance with aspects of the present disclosure. The operations of method 1000 may be implemented by a database server or its components as described herein. For example, the operations of method 1000 may be performed by a storage manager as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 1005, the database server may receive, at a server and from a tenant user device, a request to store a data structure corresponding to a container component. The operations of 1005 may be performed according to the methods described herein. In some examples, aspects of the operations of 1005 may be performed by a storage request component as described with reference to FIGS. 6 through 8.

At 1010, the database server may identify one or more attributes of the data structure corresponding to a declarative use feature of the server. The operations of 1010 may be performed according to the methods described herein. In some examples, aspects of the operations of 1010 may be performed by an attribute identifying component as described with reference to FIGS. 6 through 8.

At 1015, the database server may identify a droppable region of the container component based on the one or more attributes of the data structure. The operations of 1015 may be performed according to the methods described herein. In some examples, aspects of the operations of 1015 may be performed by a droppable region identifier as described with reference to FIGS. 6 through 8.

At 1020, the database server may determine the data structure satisfies the declarative use feature of the server based on the one or more attributes. The operations of 1020 may be performed according to the methods described herein. In some examples, aspects of the operations of 1020 may be performed by a declarative use determining component as described with reference to FIGS. 6 through 8.

At 1025, the database server may expose the container component on the user interface using the declarative use feature of the server. The operations of 1025 may be performed according to the methods described herein. In some examples, aspects of the operations of 1025 may be performed by a container component exposing component as described with reference to FIGS. 6 through 8.

Figure 11:
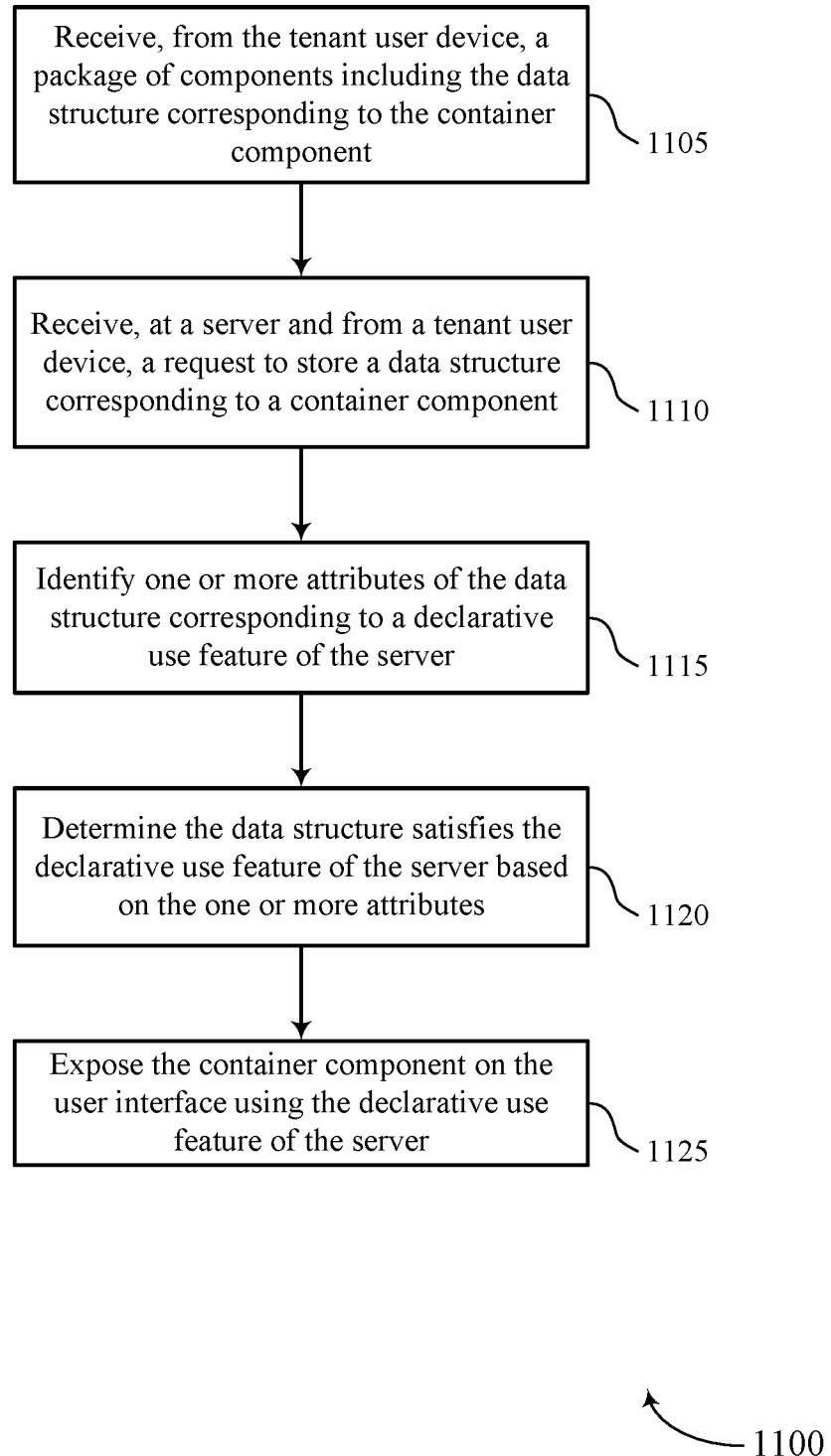

FIG. 11 shows a flowchart illustrating a method 1100 that supports declarative container components for builders in accordance with aspects of the present disclosure. The operations of method 1100 may be implemented by a database server or its components as described herein. For example, the operations of method 1100 may be performed by a storage manager as described with reference to FIGS. 6 through 8. In some examples, a database server may execute a set of instructions to control the functional elements of the database server to perform the functions described below. Additionally or alternatively, a database server may perform aspects of the functions described below using special-purpose hardware.

At 1105, the database server may receive, from the tenant user device, a package of components including the data structure corresponding to the container component. The operations of 1105 may be performed according to the methods described herein. In some examples, aspects of the operations of 1105 may be performed by a package component as described with reference to FIGS. 6 through 8.

At 1110, the database server may receive, at a server and from a tenant user device, a request to store a data structure corresponding to a container component. The operations of 1110 may be performed according to the methods described herein. In some examples, aspects of the operations of 1110 may be performed by a storage request component as described with reference to FIGS. 6 through 8.

At 1115, the database server may identify one or more attributes of the data structure corresponding to a declarative use feature of the server. The operations of 1115 may be performed according to the methods described herein. In some examples, aspects of the operations of 1115 may be performed by an attribute identifying component as described with reference to FIGS. 6 through 8.

At 1120, the database server may determine the data structure satisfies the declarative use feature of the server based on the one or more attributes. The operations of 1120 may be performed according to the methods described herein. In some examples, aspects of the operations of 1120 may be performed by a declarative use determining component as described with reference to FIGS. 6 through 8.

At 1125, the database server may expose the container component on the user interface using the declarative use feature of the server. The operations of 1125 may be performed according to the methods described herein. In some examples, aspects of the operations of 1125 may be performed by a container component exposing component as described with reference to FIGS. 6 through 8.

A method of editing components of a user interface is described. The method may include receiving, at a server and from a tenant user device, a request to store a data structure corresponding to a container component, identifying one or more attributes of the data structure corresponding to a declarative use feature of the server, determining the data structure satisfies the declarative use feature of the server based on the one or more attributes, and exposing the container component on the user interface using the declarative use feature of the server.

An apparatus for editing components of a user interface is described. The apparatus may include a processor, memory in electronic communication with the processor, and instructions stored in the memory. The instructions may be executable by the processor to cause the apparatus to receive, at a server and from a tenant user device, a request to store a data structure corresponding to a container component, identify one or more attributes of the data structure corresponding to a declarative use feature of the server, determine the data structure satisfies the declarative use feature of the server based on the one or more attributes, and expose the container component on the user interface using the declarative use feature of the server.

Another apparatus for editing components of a user interface is described. The apparatus may include means for receiving, at a server and from a tenant user device, a request to store a data structure corresponding to a container component, identifying one or more attributes of the data structure corresponding to a declarative use feature of the server, determining the data structure satisfies the declarative use feature of the server based on the one or more attributes, and exposing the container component on the user interface using the declarative use feature of the server.

A non-transitory computer-readable medium storing code for editing components of a user interface is described. The code may include instructions executable by a processor to receive, at a server and from a tenant user device, a request to store a data structure corresponding to a container component, identify one or more attributes of the data structure corresponding to a declarative use feature of the server, determine the data structure satisfies the declarative use feature of the server based on the one or more attributes, and expose the container component on the user interface using the declarative use feature of the server.

Some examples of the method, apparatuses, and non-transitory computer-readable medium described herein may further include operations, features, means, or instructions for identifying a droppable region of the container component based on the one or more attributes of the data structure.

Some examples of the method, apparatuses, and non-transitory computer-readable medium described herein may further include operations, features, means, or instructions for receiving, from the tenant user device, a package of components including the data structure corresponding to the container component.

Some examples of the method, apparatuses, and non-transitory computer-readable medium described herein may further include operations, features, means, or instructions for restricting a type of component from being contained by the container component based on the one or more attributes.

Some examples of the method, apparatuses, and non-transitory computer-readable medium described herein may further include operations, features, means, or instructions for receiving, at the server and from the tenant user device, a second request to store a second data structure corresponding to a non-container component and exposing the non-container component on the user interface using the declarative use feature of the server, where the non-container component may be contained by the container component.

Some examples of the method, apparatuses, and non-transitory computer-readable medium described herein may further include operations, features, means, or instructions for identifying a set of default components contained by the container component, where the set of default components may be exposed on the user interface within the container component.

In some examples of the method, apparatuses, and non-transitory computer-readable medium described herein, the container component includes a third-party-developed container component configured for the declarative use feature of the server.

In some examples of the method, apparatuses, and non-transitory computer-readable medium described herein, a component array attribute of the one or more attributes of the data structure indicates the container component may be configured to contain other components.

In some examples of the method, apparatuses, and non-transitory computer-readable medium described herein, the declarative use feature of the server includes a drag and drop feature, and the container component may be configured for the drag and drop feature.

In some examples of the method, apparatuses, and non-transitory computer-readable medium described herein, the user interface may be for a web development platform.

In some examples of the method, apparatuses, and non-transitory computer-readable medium described herein, the container component contains one or more non-container components.

In some examples of the method, apparatuses, and non-transitory computer-readable medium described herein, the container component includes one or more features modifiable by an administrator of the tenant user device based on the declarative use feature of the server.

It should be noted that the methods described above describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for editing components of a container component, comprising:
   receiving, at an application builder application, a package comprising at least a first data structure defining the container component;
   determining that the first data structure is compatible with a declarative use feature of the application builder application that supports users declaratively adding one or more additional components within the container component;
   exposing the container component for user customization via a user interface of a user device;
   receiving, at the application builder application, a request from a user to add an additional component within a region of the exposed container component using the declarative use feature;
   determining whether the additional component is compatible with the region of the container component based at least in part on the first data structure and a second data structure defining the additional component; and
   updating the container component to contain the additional component based on determining that the additional component is compatible with the region.

2. The method of claim 1, further comprising:
   identifying that the region is a droppable region of the container component based at least in part on one or more first attributes of the first data structure.

3. The method of claim 2, further comprising:
   receiving, via the user interface, a second request to expose a non-container component within the droppable region of the container component.

4. The method of claim 3, further comprising:
   determining whether the non-container component is compatible with the container component based at least in part on the first data structure and a third data structure defining the non-container component.

5. The method of claim 4, wherein determining whether the non-container component is compatible with the container component comprises:
   determining that the non-container component is compatible with the container component, the method further comprising:
      exposing the non-container component within the droppable region of the container component based at least in part on determining that the non-container component is compatible with the container component.

6. The method of claim 5, wherein determining that the non-container component is compatible with the container component comprises:
   determining that the third data structure is compatible with the declarative use feature of the application builder application based at least in part on one or more second attributes of the third data structure.

7. The method of claim 4, wherein determining whether the non-container component is compatible with the container component comprises:
   determining that the non-container component is incompatible with the container component, the method further comprising:
      restricting the non-container component from being exposed within the droppable region of the container component based at least in part on determining that non-container component is incompatible with the container component.

8. The method of claim 3, wherein the package further comprises the non-container component.

9. The method of claim 2, further comprising:
   receiving, via the user interface, a second request to expose a plurality of non-container components within the droppable region of the container component;

determining that the plurality of non-container components are compatible with the container component; and exposing the plurality of non-container components within the droppable region of the container component.

10. The method of claim 2, further comprising:

identifying a set of default non-container components, wherein the set of default non-container components are exposed within the droppable region of the container component.

11. The method of claim 1, wherein the container component comprises a third-party-developed container component configured for the declarative use feature of the application builder application.

12. The method of claim 1, wherein a component array attribute of the first data structure indicates the container component is configured to contain other non-container components.

13. The method of claim 1, wherein the declarative use feature of the application builder application comprises a drag and drop feature, and the container component is configured for the drag and drop feature.

14. The method of claim 1, wherein the user interface is for a web development platform.

15. The method of claim 1, wherein the container component comprises one or more features modifiable by an administrator based at least in part on the declarative use feature of the application builder application.

16. An apparatus for editing components of a container component, comprising:

a processor;

memory coupled with the processor; and instructions stored in the memory and executable by the processor to cause the apparatus to:

receive, at an application builder application, a package comprising at least a first data structure defining the container component;

determine that the first data structure is compatible with a declarative use feature of the application builder application that supports users declaratively adding one or more additional components within the container component;

expose the container component for user customization via a user interface of a user device;

receive, at the application builder application, a request from a user to add an additional component within a region of the exposed container component using the declarative use feature;

determine whether the additional component is compatible with the region of the container component based at least in part on the first data structure and a second data structure defining the additional component; and update the container component to contain the additional component based on determining that the additional component is compatible with the region.

17. The apparatus of claim 16, wherein the instructions are further executable by the processor to cause the apparatus to:

identify that the region is a droppable region of the container component based at least in part on one or more first attributes of the first data structure.

18. The apparatus of claim 17, wherein the instructions are further executable by the processor to cause the apparatus to:

receive, via the user interface, a second request to expose a non-container component within the droppable region of the container component.

19. The apparatus of claim 18, wherein the instructions are further executable by the processor to cause the apparatus to:

determine whether the non-container component is compatible with the container component based at least in part on the first data structure and a third data structure defining the non-container component.

20. The apparatus of claim 19, wherein the instructions to determine whether the non-container component is compatible with the container component are executable by the processor to cause the apparatus to:

determine that the non-container component is compatible with the container component, wherein the instructions are further executable by the processor to cause the apparatus to:

expose the non-container component within the droppable region of the container component based at least in part on determining that the non-container component is compatible with the container component.

* * * * *